US006862673B2

(12) United States Patent
Lee et al.

(10) Patent No.: US 6,862,673 B2
(45) Date of Patent: Mar. 1, 2005

(54) COMMAND ORDER MAINTENANCE SCHEME FOR MULTI-IN/MULTI-OUT FIFO IN MULTI-THREADED I/O LINKS

(75) Inventors: Shao-Kuang Lee, Hsin-Chu (TW); Jen-Pin Su, Hsin-chu (TW); Tsan-Hui Chen, Hsin-chu (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 535 days.

(21) Appl. No.: 10/003,168

(22) Filed: Nov. 14, 2001

(65) Prior Publication Data

US 2003/0093637 A1 May 15, 2003

(51) Int. Cl.[7] .............................................. G06F 12/00
(52) U.S. Cl. ...................... 711/169; 711/106; 711/54; 710/36; 710/44; 710/52
(58) Field of Search ................................. 711/169, 106, 711/154; 710/36, 39, 44, 6, 52, 1

(56) References Cited

U.S. PATENT DOCUMENTS 6,481,251 B1 * 11/2002 Meier et al. .................... 70/52
6,671,747 B1 * 12/2003 Benkual et al. ................ 710/1

\* cited by examiner

Primary Examiner—Kimberly McLean-Mayo

(57) ABSTRACT

A mechanism for maintaining the first-in first-out order of commands in a multiple-input and multiple-output buffer structure includes a command number generator for generating and assigning a command number to each command entering the buffer structure, and a command number comparator for comparing the command number of the outgoing command at each buffer in the buffer structure to determine which command should exit. Both command number generator and command comparator have a cyclic counter that has a period greater than or equal to the total number of allowable buffer entries in the buffer structure. For maintaining order of posted and non-posted command queues, a pending posted write counter is used in the posted command queue to record the number of pending posted write command and each entry in the non-posted command queue is associated with a dependency counter.

13 Claims, 18 Drawing Sheets

COMMAND ORDER MAINTENANCE SCHEME FOR MULTI-IN/MULTI-OUT FIFO IN MULTI-THREADED I/O LINKS

FIELD OF THE INVENTION

The present invention generally relates to a first-in/first-out (FIFO) buffer structure having multiple input ports and multiple output ports (multi-in/multi-out), and more specifically to a mechanism for maintaining the order of commands consumed by a multi-in/multi-out FIFO structure.

BACKGROUND OF THE INVENTION

In a single first-in/first-out (FIFO) structure, only one input port is used to accept transactions. Because it does not have the capability of providing sufficient data throughput, the FIFO structure presents a drawback in a multi-threaded environment in which transactions may happen concurrently.

A multi-in and multi-out FIFO structure provides the capability to accept transactions concurrently. The multi-in and multi-out FIFO comprises multiple parallel single-in and single-out FIFOs with the same or different number of entries. No matter how many input ports are, the structures of all the single-in and single-out FIFOs composing the FIFO structure are usually uniform. In other words, it is easy to expand to any number of ports. However, because this FIFO structure has multiple output ports, it loses the property of first-in and first-out and must have additional mechanism to maintain the order of transactions.

As an example, one device uses a pipelining architecture to perform read transactions. Before the prior read transaction completes, the subsequent request is issued. Because multiple input ports are provided by the multi-in and multi-out FIFO, it is possible that the prior request is queued into one port and the subsequent request is queued into another port. If the output control of the two ports is independent, the later request may pass through the prior one and the response order of the two read transactions will be reversed.

The same problem of reversed order also occurs in a multi-in and multi-out posted FIFO. Once the write transaction is posted into the posted FIFO, the device producing the write data presumes that the write transaction it issued has been completed and may want to issue another transaction for setting a flag to inform the consumer to take the data away. If the write transaction setting the flag is outputted from the FIFO earlier than the one carrying data, the data consumer will read the flag first and then may read the wrong data before the correct data actually reach the destination.

To avoid mixing up the order between posted and non-posted FIFO in a system, the following method may be adopted. The non-posted FIFO will reject non-posted transactions temporarily until all of the prior posted write transactions are actually retired in the consuming end of the posted FIFO. At the same time, the posted FIFO must block the subsequent posted write transactions that will disturb the read transaction. Although this method is simple and intuitive, it breaks the concurrency of read and write transactions and is not practicable in a multi-threaded system.

SUMMARY OF THE INVENTION

This invention has been made to overcome the mentioned drawback of a conventional multi-in and multi-out FIFO structure. The primary object of this invention is to provide a command order control scheme for a multi-in and multi-out FIFO structure to avoid losing the order in the FIFO structure. By using the control scheme with the multi-in and multi-out FIFO structure, concurrent read or write transactions can maintain their order.

Accordingly, the multi-in and multi-out FIFO structure of this invention comprises a command number generator (CNG) in a producing end and a command number comparator (CNC) in a consuming end for controlling a plurality of single-in and single-out FIFOs. Each command entering the FIFO structure is assigned a command order number (CON) by a cyclic counter in the CNG. The CNC that also has a cyclic counter determines the order of consuming the commands stored in the multiple FIFOs.

Another object of the invention is to provide a scheme to control the order of a command or transaction that comprises a number of subcommands. Two different skills are adopted in non-posted FIFO and posted FIFO respectively. The subcommands of a non-posted command are queued into a non-posted FIFO with an identical command order number. The last entry of the subcommands is tagged with an end of transaction indicator. In addition to comparing the CON, the command number comparator checks the arrival of an end of transaction indicator to ensure that all subcommands of a command are consumed without interruption such that shorter access latency is approachable. On the other hand, the subcommands belong to a posted command which are queued into a posted FIFO will get different CONs. Because any posted subcommand will not be generated in the producing end until its corresponding data are ready, the subcommands of a posted transaction will be queued into FIFO in different time. Obviously, subcommands of a later posted transaction with shorter data length may be queued into FIFO earlier than some subcommands of the prior posted transaction with longer data length. According to the above example, to allocate the same ordering number to all the subcommands of a longer posted transaction issued by one device to make them be executed consecutively will be meaningless since it may interfere the consumption of the subcommands of a shorter transaction issued by another device in the other FIFO. FIG. 1A illustrates the relationship between the two transactions on a time scale chart.

It is also an object of the invention to provide an order control scheme for posted and non-posted FIFOs. FIG. 1B shows the generic architecture of the invented scheme. A pending posted write counter is used in the posted FIFO side to record the number of pending posted write transactions. Each entry in the non-posted FIFO side has a dependency counter to record how many pending posted write transactions must be processed prior to consuming the non-posted command entry. When a read transaction occurs, it can't be executed in the consuming end until all the pending posted-write transactions prior to the read transaction are consumed.

It is a further object of the invention to provide an order control scheme for a posted FIFO in which a long write transaction is divided into multiple basic write commands and the last basic write command is tagged with an end of transaction indicator. A pending posted write counter is not increased until the last basic write command is queued into the posted FIFO. Making the pending posted write counter increase only when the last basic write command arrives can reduce unnecessary waiting of the non-posted transactions.

The foregoing and other objects, features, aspects and advantages of the present invention will become better understood from a careful reading of a detailed description provided herein below with appropriate reference to the accompanying drawings.

DETAILED DESCRIPTION OF THE INVENTION

According to the present invention, in order to maintain the order relationship between all of the entries in multiple FIFOs, an order number called command order number (CON) is assigned to every incoming transaction or command. The CON is stored into the multiple FIFOs together with other command information and used to decide which entry is the front one to be picked up for consumption.

Figure 1A:
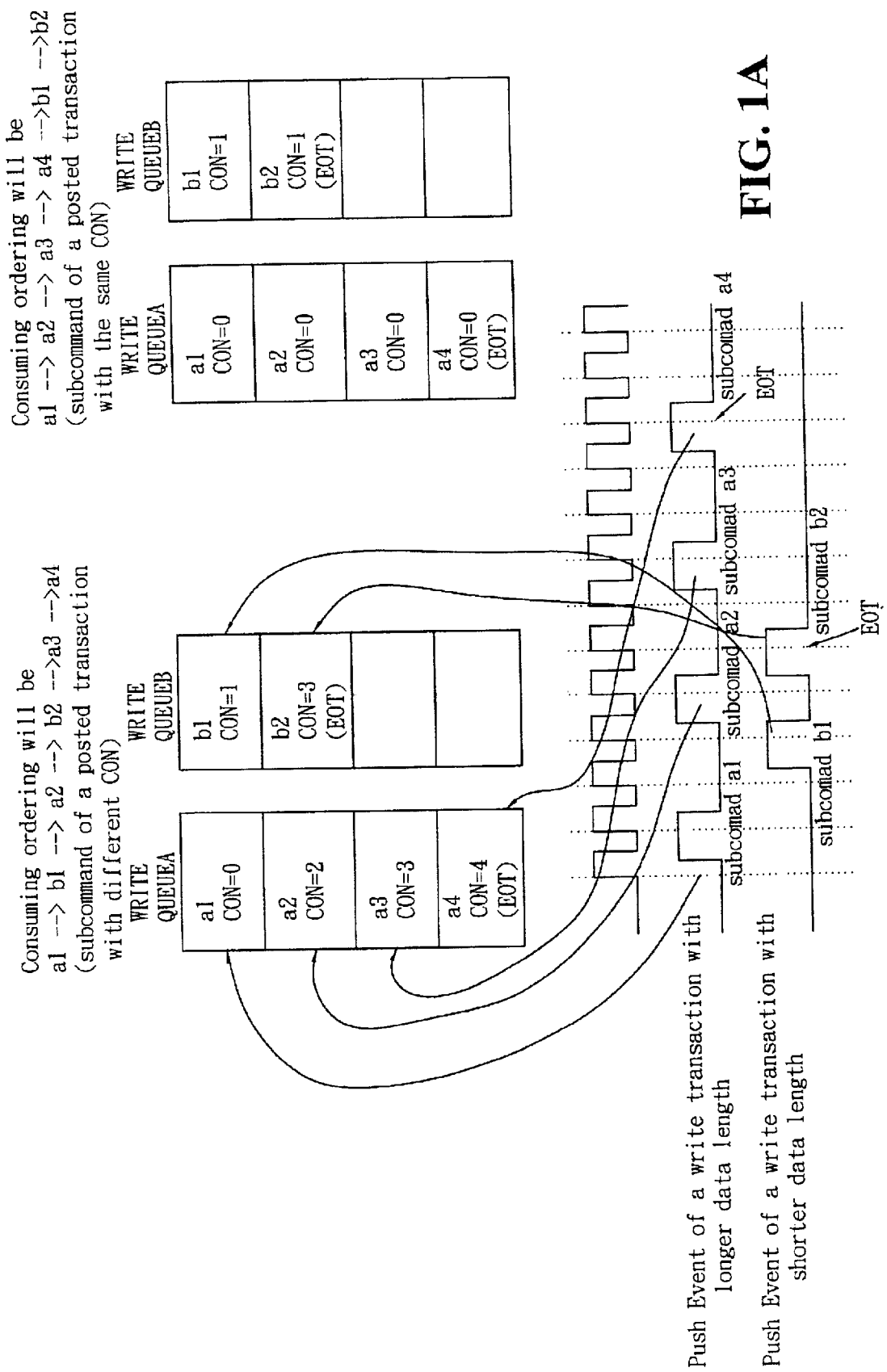
FIG. 1A illustrates the relationship between two posted transactions.
Figure 1B:
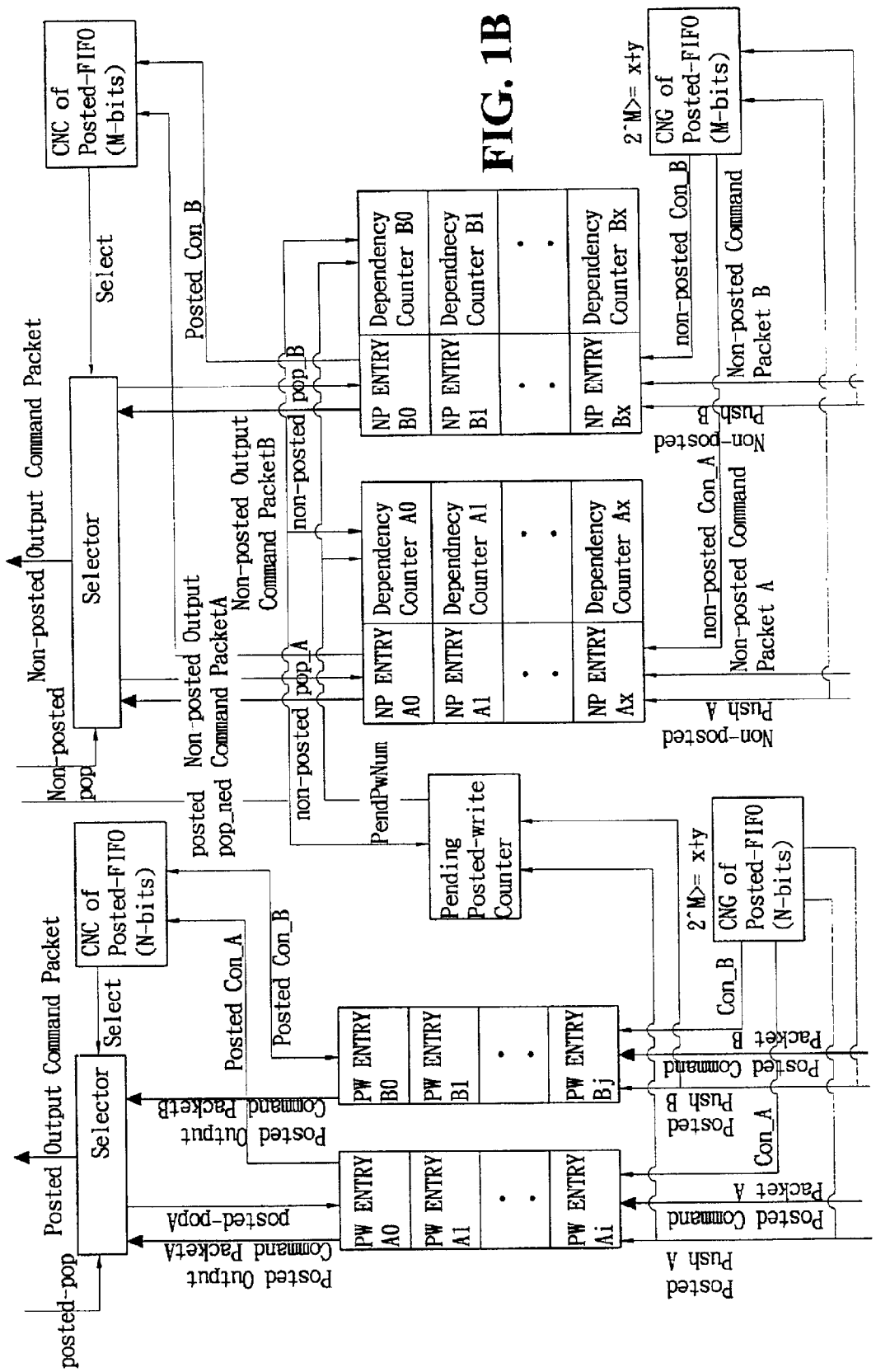
FIG. 1B shows the generic architecture of the present invention.
Figure 1C:
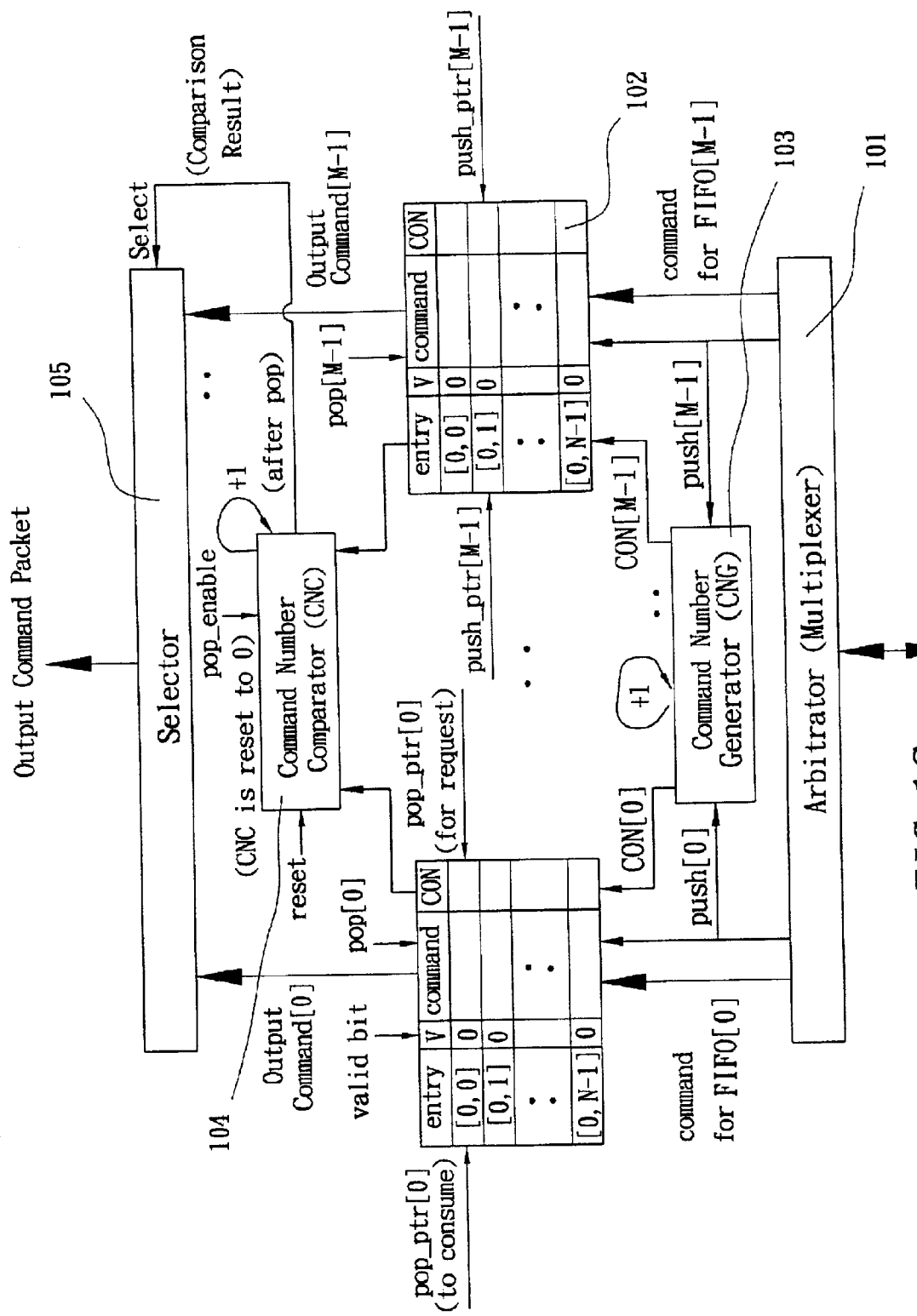
FIG. 1C shows a multiple-input and multiple-output (M×N) FIFO structure in multi-threaded I/O link design according to this invention.

FIG. 1C illustrates a multiple-input/multiple-output FIFO structure of this invention used in multi-threaded I/O link design. The FIFO structure comprises a multiplexer 101 that has a plurality of outputs to a plurality of FIFO ports 102. M FIFO ports each having a capacity of N entries is assumed in the example of FIG. 1C. A command number generator (CNG) 103 in the producing end generates a CON for each command. A command number comparator (CNC) 104 in the consuming end compares the CON of the entry at each FIFO port in order to choose the matched entry to output. Both CNG and CNC have a cyclic up-count counter that is reset to zero in the initial phase. A selector 105 controlled by the comparison result of the command number comparator 104 outputs the command packets.

The counter of CNG increases its value whenever commands are stored into the FIFOs. The counter increment depends on how many commands occur simultaneously. If multiple commands occur, the increment will be more than one. The present value of CNG is used to generate the CON for the commands that are stored into the command queues (FIFOs). If one command occurs, the CNG outputs only one CON. If two commands occur, the CNG outputs two consecutive CONs.

In the consuming end, the CNC with a similar structure and operation is used to decide which command entry is the front one. The decision scheme is to compare the CON in the front entry of each FIFO. The entry with CON matching the value of CNC is picked up as the consuming candidate. Upon retrieval of the entry, the CNC counter is incremented.

The entry with a smaller CON is not always the front entry. This is mainly because a finite cyclic CON set is employed in the CON assignment. The entry with a larger CON may be stored into the queue prior to the entry with a smaller CON. Because the larger CON entry may occur in a precedent cyclic CON generation loop while the smaller CON entry occurs in a current cyclic CON generation loop, a mechanism of picking up the entry with a smaller CON as the front entry cannot work properly for such a structure. Therefore, the present invention provides a decision scheme to pick up the correct front entry instead of the one with a smaller CON.

With reference to FIGS. 2A–2F, a two-entry FIFO with two ports is used to explain the operation of the present invention in detail. Both counters of CNG and CNC are initialized to zero during reset. After reset, the CON in the front entry of each FIFO may be zero and is equal to the CNC value. However, both entries are invalid since no entry has been stored into the FIFO yet. In this situation, no entry will be picked up although the CON matches the CNC value. In other words, the front entry is not consumed in the consuming end unless the entry is valid and its CON is equal to the CNC value.

Figure 2A:
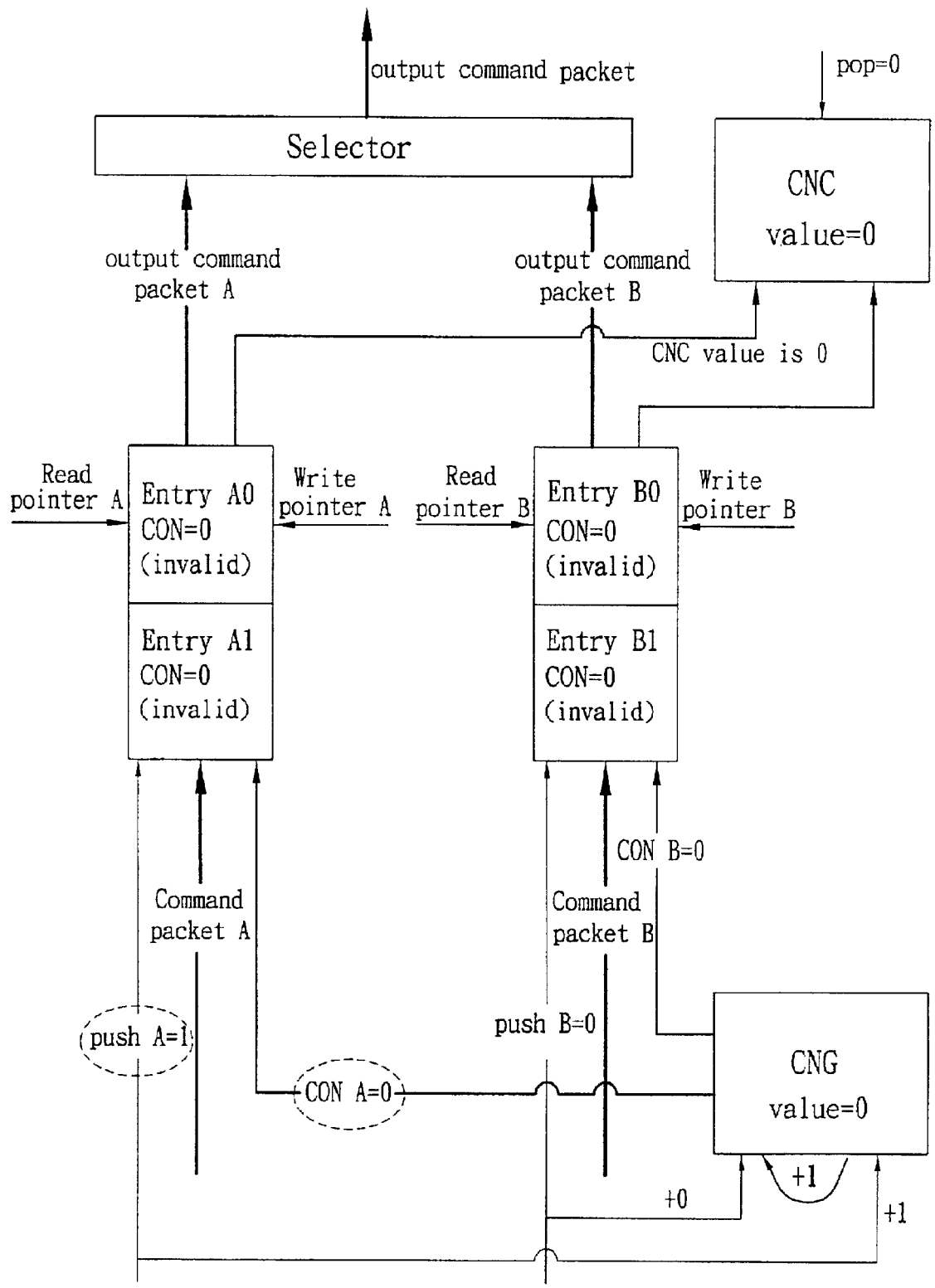
FIGS. 2A–2F illustrate the operation of the command number generator and the command number comparator using a two-entry FIFO with two ports according to this invention.
Figure 2B:
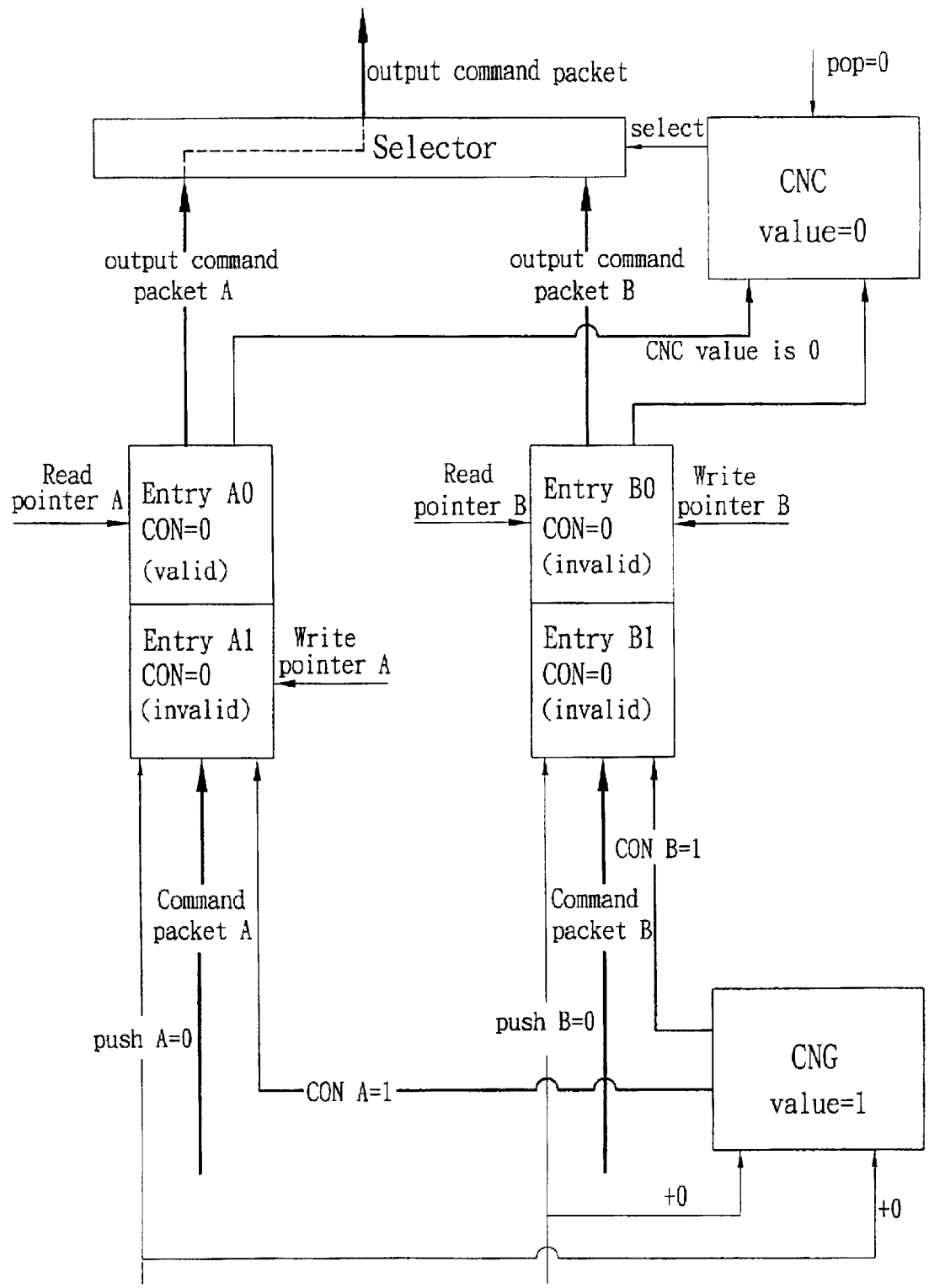

FIGS. 2A–2F illustrate the operation of CNG and CNC step by step. In FIG. 2A, a command (push_A=1) occurs and the associated command packet is going to be stored into the command queue A. Because only one command occurs in the producing end, CNG outputs only one valid CON (CON_A=0) which is stored into the entry A0 of the command queue A along with other information for this command as shown in FIG. 2B. When this command is queued into the command queue, the value of CNG is increased by 1 so as to be used as the next CON for the subsequent command. In the consuming end, the CNC compares the CON of the incoming valid entry and then picks up the entry as the candidate to be consumed if the entry has the matched CON.

Figure 2C:
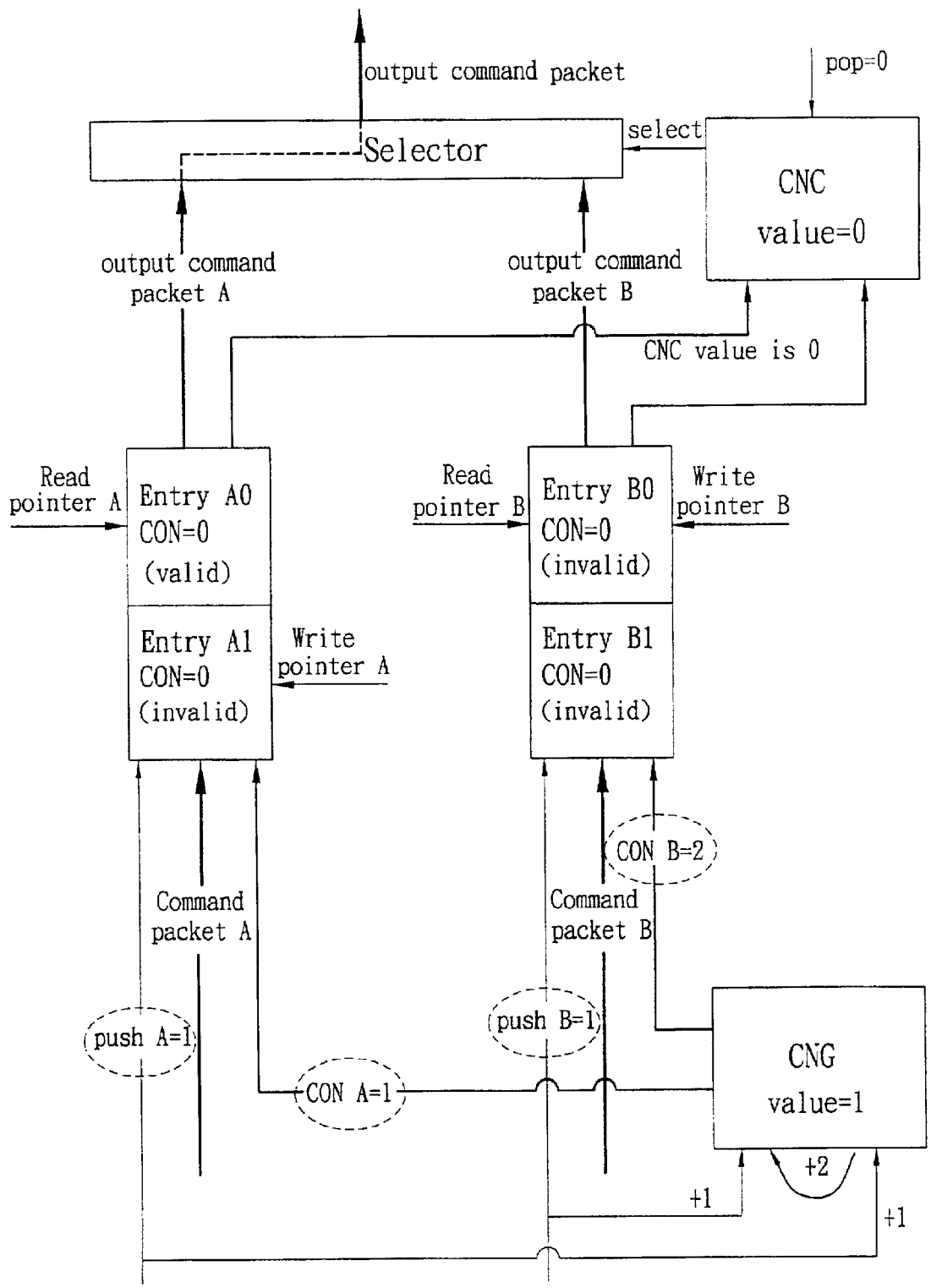
Figure 2D:
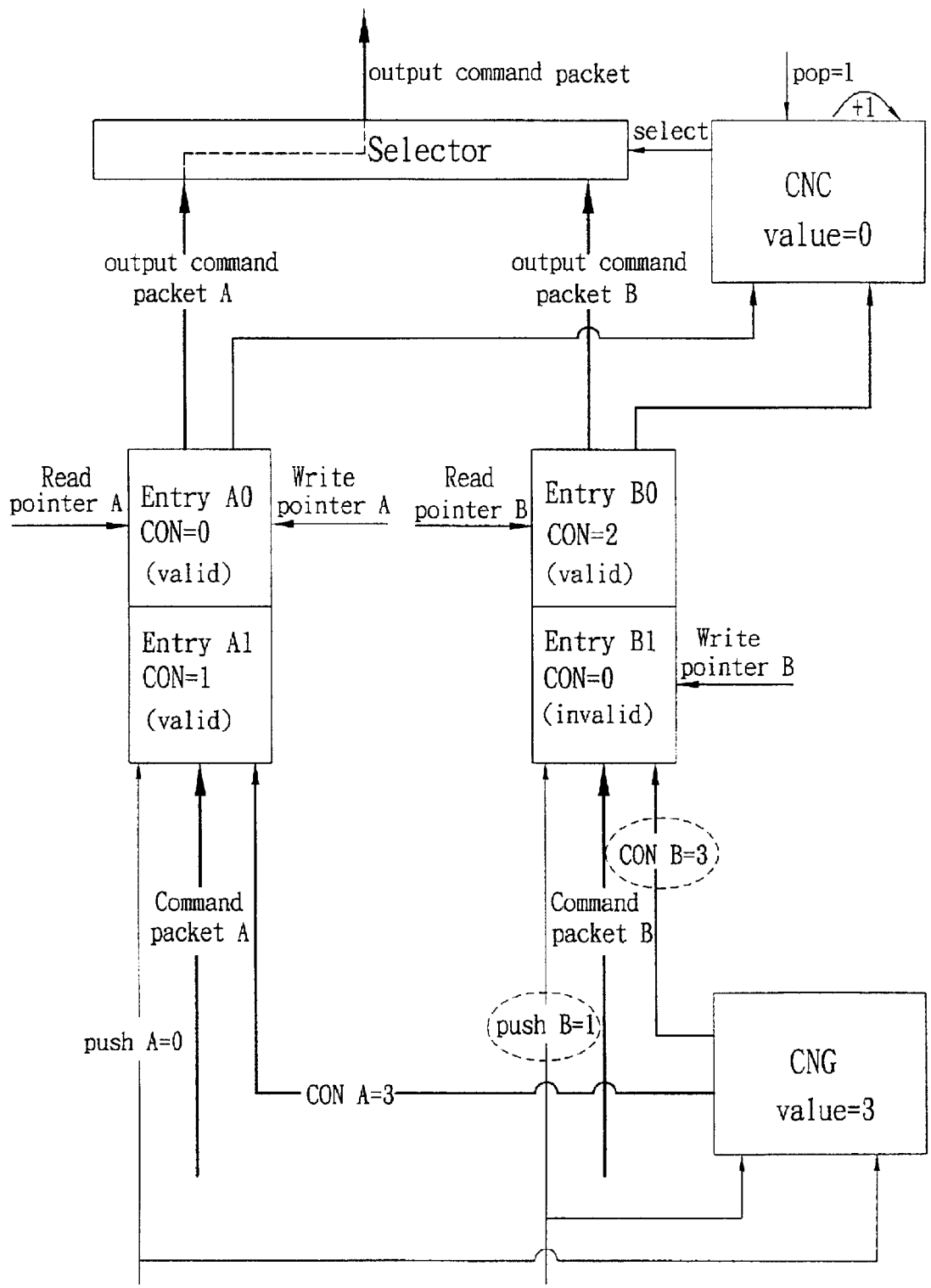

In FIG. 2C, two commands (push_A=1 and push_B=1) occur at the same time in the producing end, so CNG outputs two valid CONs (CON_A=1 for command queue A and CON_B=2 for command queue B) for these two commands respectively. After these two commands are queued into different command FIFOs, the CNG value is increased from 1 to 3. In FIG. 2D, the previous entry with CON=0 in the command queue A is going to be retired in the consuming end and the value of CNC will be increased. In the mean time, a new command is going to be stored into the FIFO of the command queue B in the producing end. CNG outputs only one valid CON (CON_B=3) because there is no command to the command queue A (push_A=0 and push_B=1).

Figure 2E:
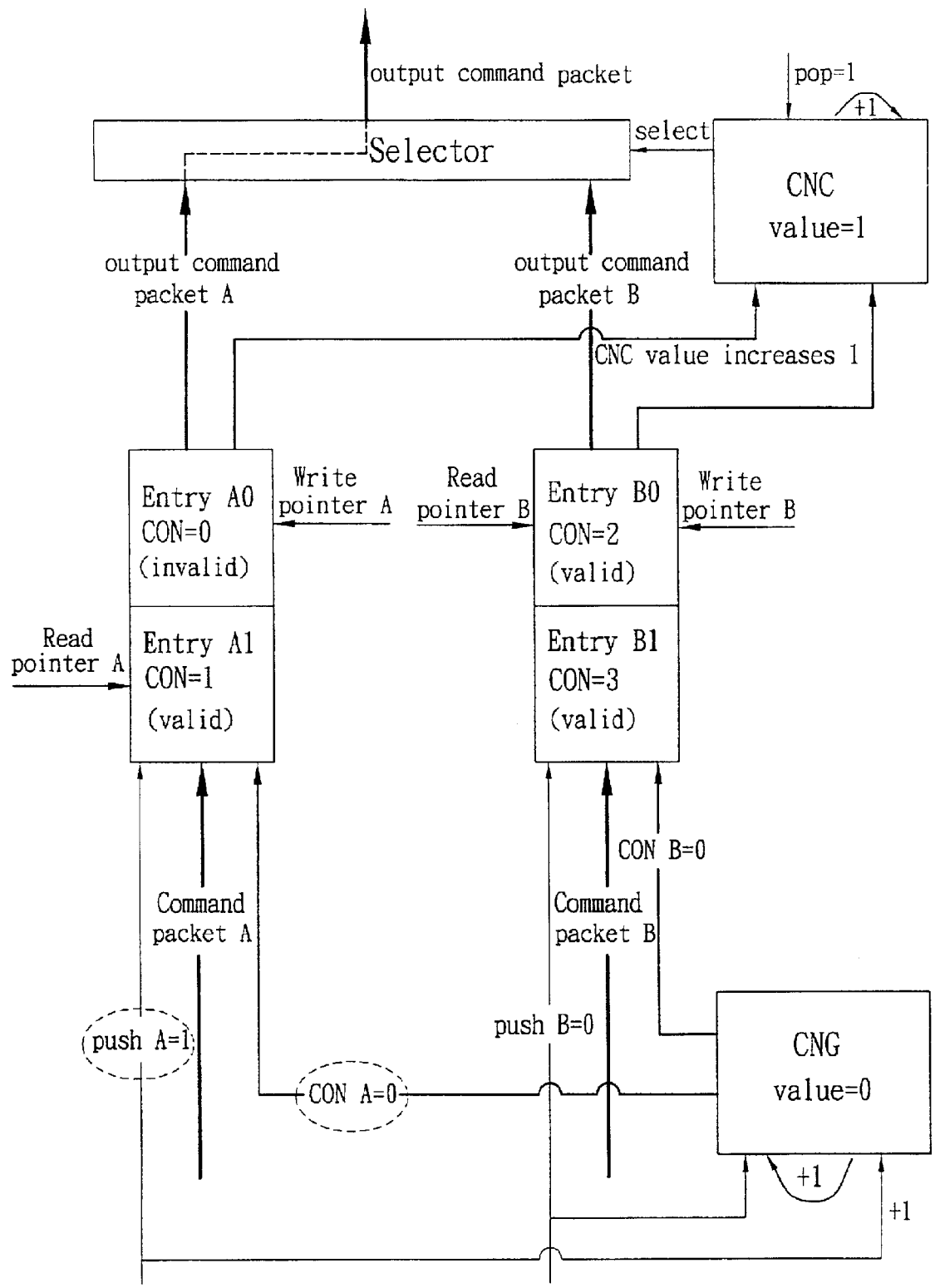
Figure 2F:
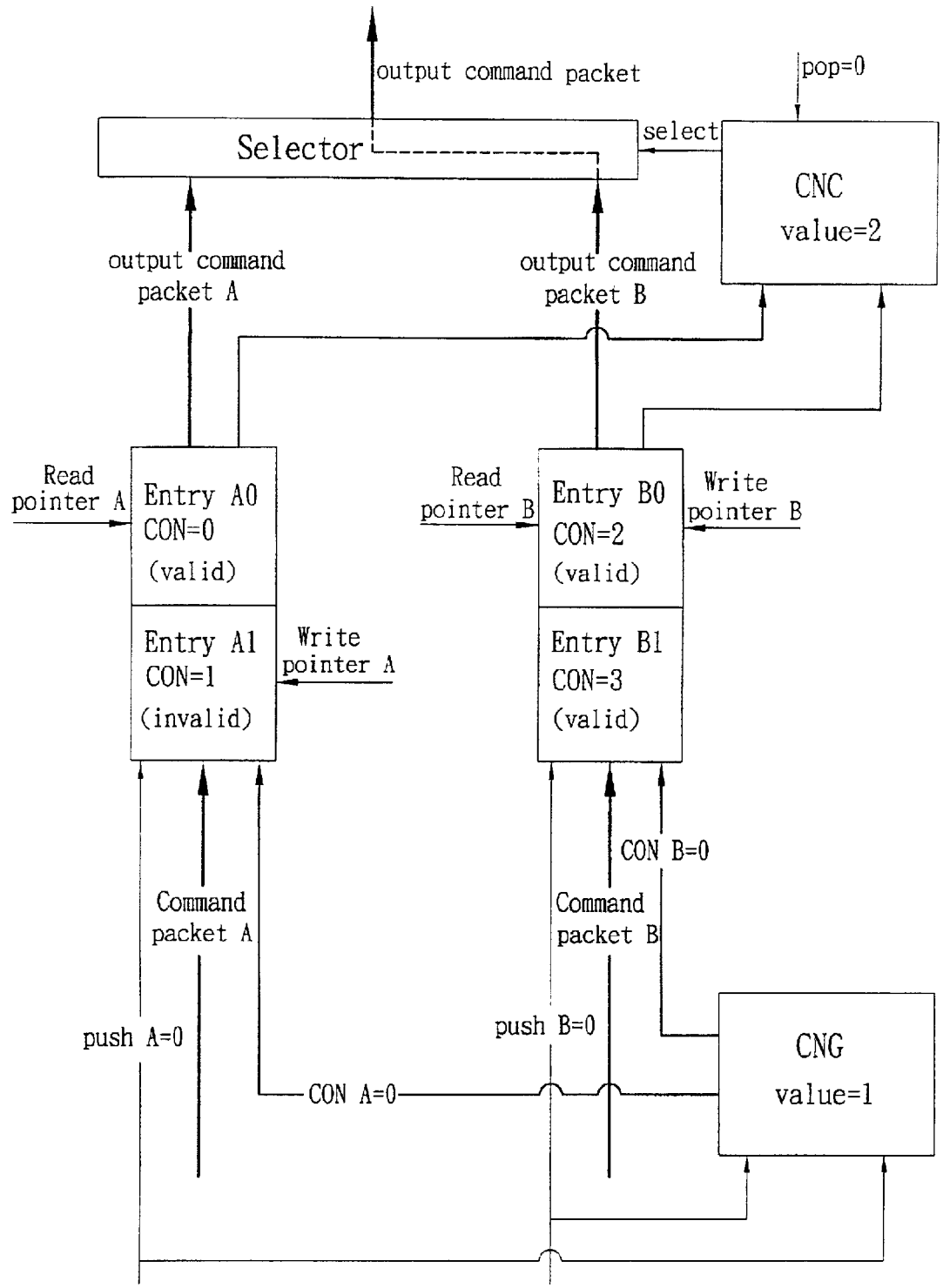

With reference to FIG. 2E, the CNC value is changed from 0 to 1 and the retired command entry with CON=0 becomes invalid. Because the value of CNC is 1 at present, the command packet in the command queue A with CON =1 becomes the front entry and will be picked up for consumption. In the producing end, the CNG has finished one cyclic loop and returned to 0 again after the command packet with CON=3 is queued into the command queue B. Provided that there is an active command to the command queue A, the command packet with CON=0 will be queued into command queue A. In FIG. 2F, the command entry with CON=1 in the command queue A has been consumed and the CNC value is changed to 2. The command entry in the command queue B with CON=2 has the matched CON now and will be chosen next for consumption.

In this case, the command entry with CON=0 in the command queue A has a smaller CON than the one with CON=2 in the command queue B. However, the entry with CON=2 is queued into the command queue B earlier than the entry with CON=0 queued into the command queue A. This is why the present invention provides a decision scheme with the command number comparator 104 to pick up the entry with the correct CON instead of the one with the smaller CON. Because a finite cyclic CON set is employed in this scheme, the CON set must provide sufficient number of CONs to avoid that two valid entries may get the same CON at different time. It means that the number of CONs should be larger than or equal to the total number of entries that can be buffered in the multiple FIFOs.

In the above description, an example of 2-way FIFOs is used to explain the basic concept and operation of the present invention. The arrival of a command makes the value of CNG increase and the increased value is dependent on how many requests occur in the producing end simultaneously. Similarly, the value of CNC increases once a front entry has been retired in the consuming end.

As mentioned above, each FIFO accepts only one command at a time. In practice, one command may be divided into more than one basic subcommand to meet the requirement or simplify the process of the consuming end. For non-posted transactions with given data length, every basic subcommand will be queued into the FIFO simultaneously. If the non-posted subcommands can be consumed consecutively, the overall performance may be improved. To make this approachable, the subcommands of a non-posted command queued into the FIFO get the same CON and the value of the CNC does not increase until all the basic subcommands belong to the divided command are retired in the consuming end.

Figure 3A:
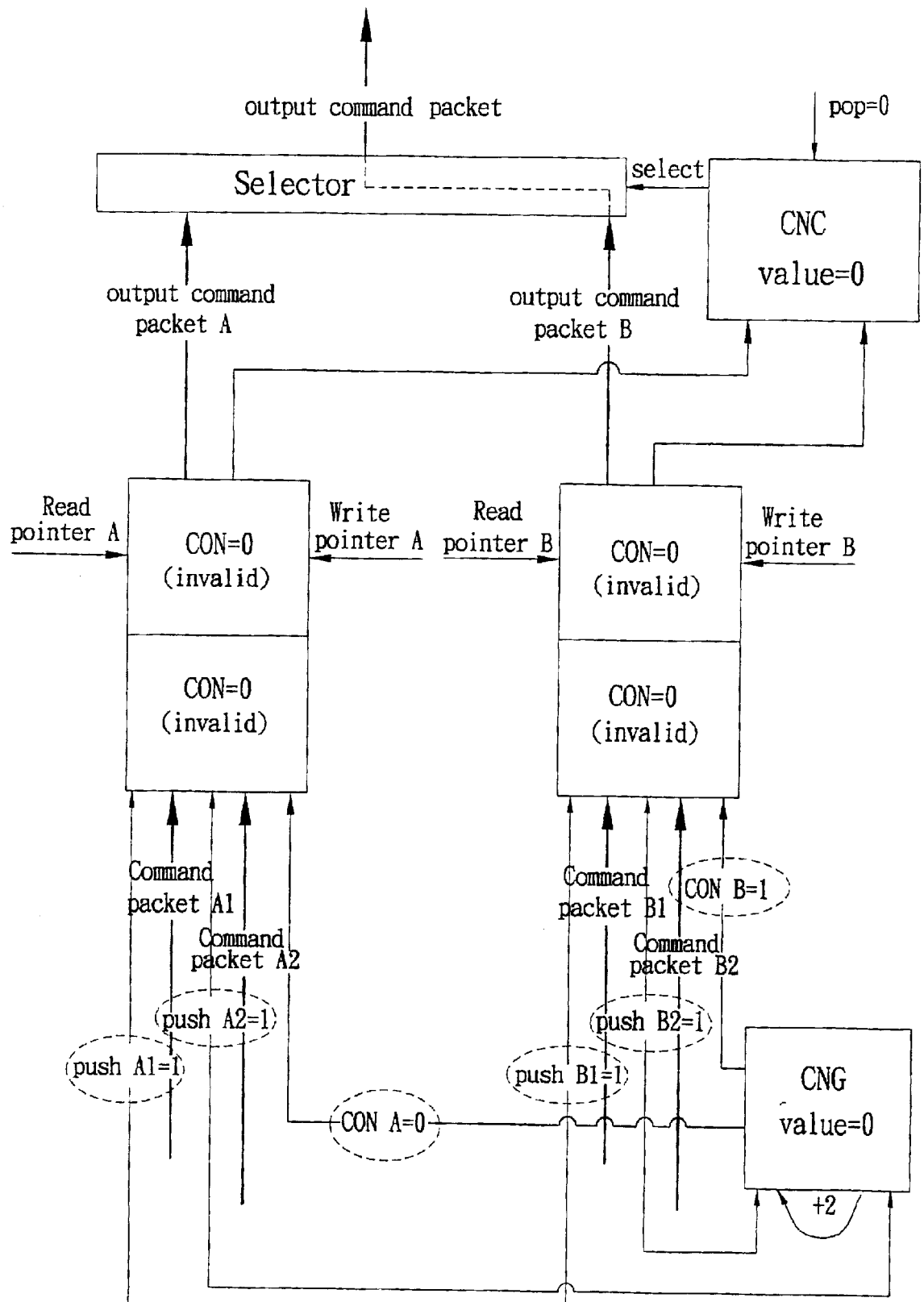
FIGS. 3A–3C illustrate that a command transaction may comprise a plurality of subcommands with the last subcommand being tagged with an end of transaction indicator and each subcommand being assigned with an identical command order number.
Figure 3B:
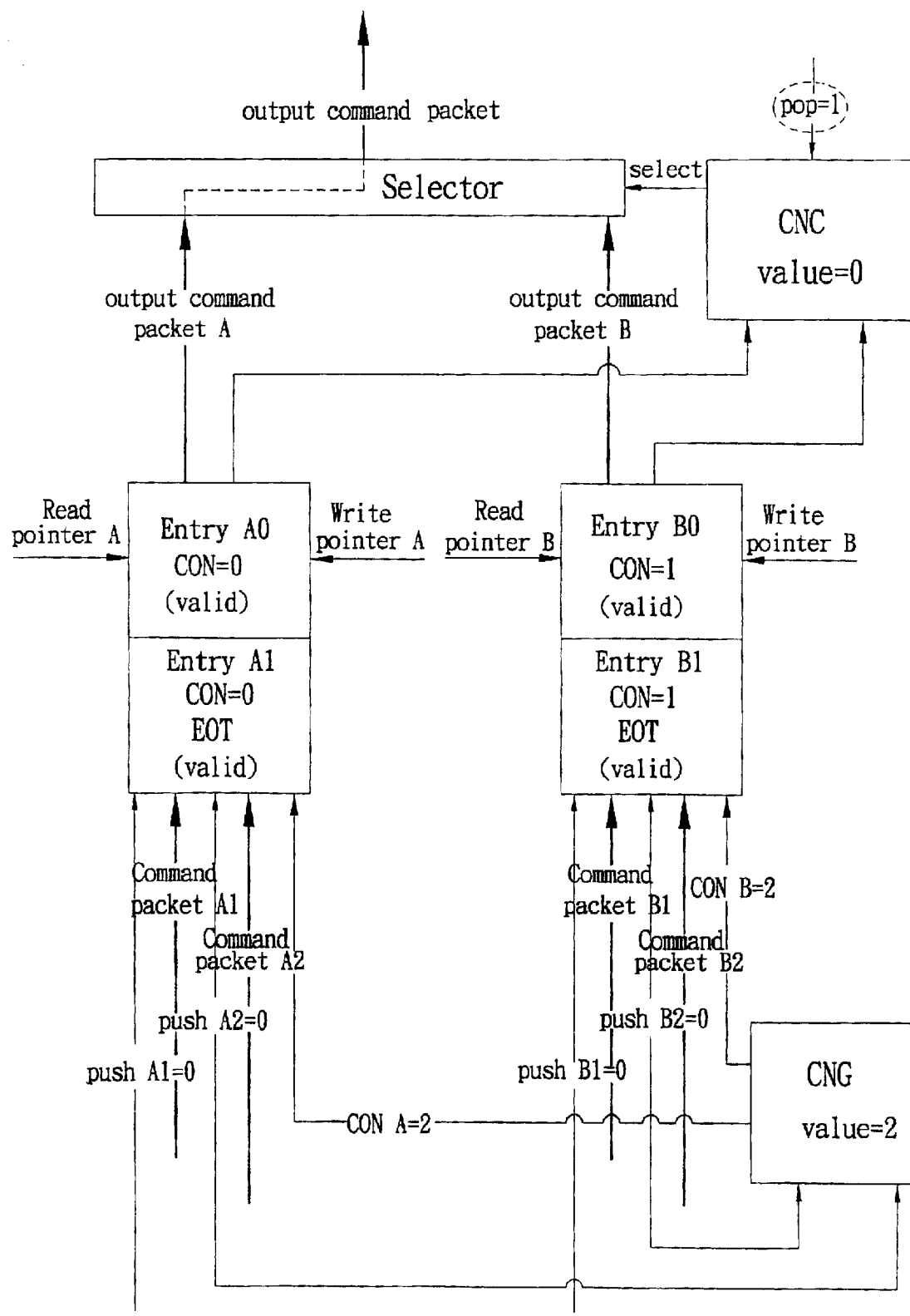
Figure 3C:
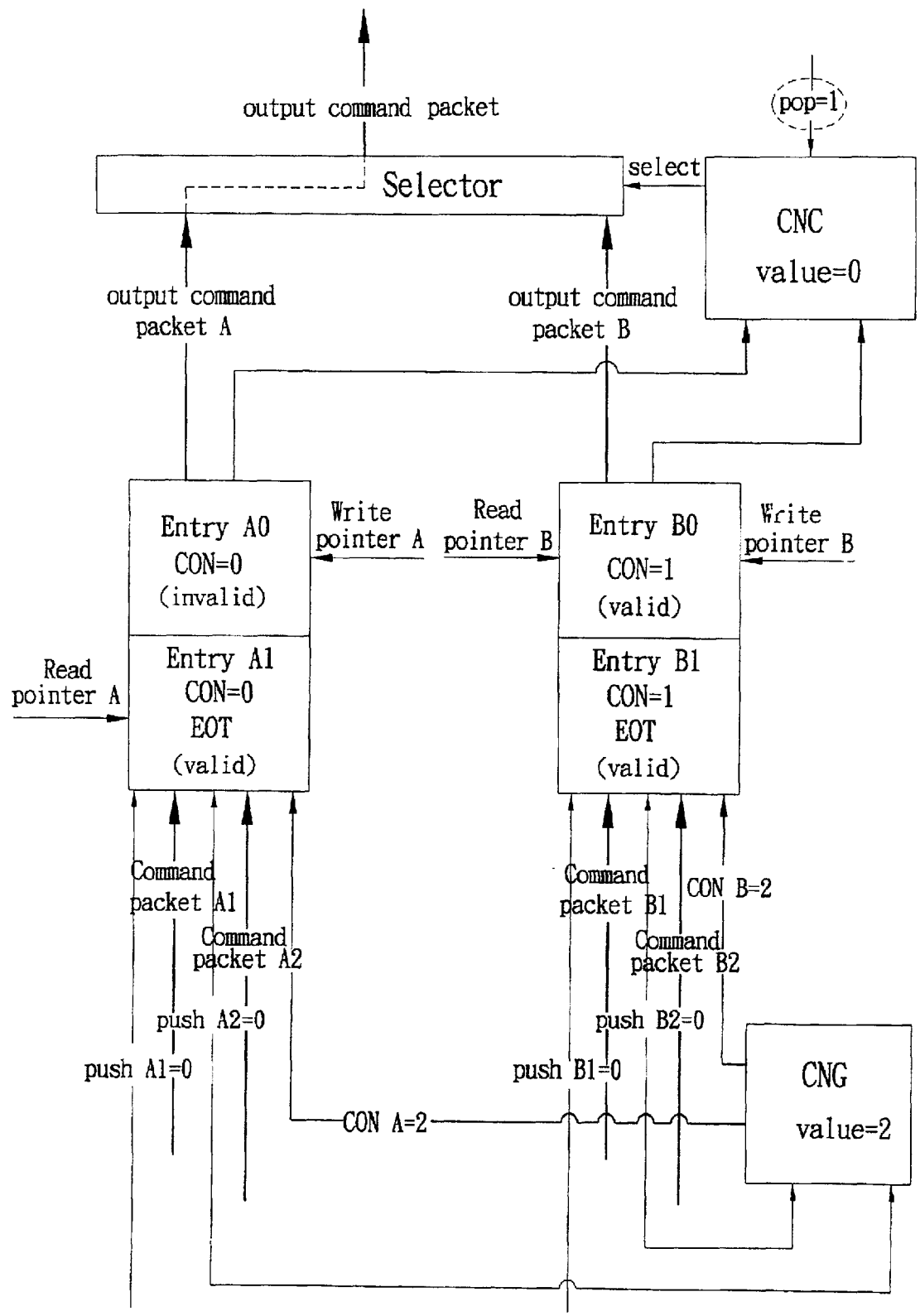

Accordingly, an end of transaction (EOT) indicator is tagged with the last basic subcommand so that the consuming end can determine when to increase the value of CNC. An example in which two commands occur concurrently and both commands are divided into two basic subcommands is illustrated in FIGS. 3A–3C for further explanation. Command packets stored into the command queue A get the same CON (CON=0) and the last entry has an EOT indicator. Command packets stored into the command queue B get the same CON (CON=1) and the last entry also has an EOT indicator as shown in FIG. 3B.

The entry with CON=0 in the command queue A pointed by a read pointer will be picked up first. When this entry has been retired, the value of CNC will remain at 0 as shown in FIG. 3C since no EOT has appeared yet. The consuming end continuously picks up the second entry with CON=0 and EOT to be consumed. After the second entry is retired, the value of the CNC is increased and the command entry with CON=1 in the command queue B will be chosen to be the next consuming candidate. Both entries with CON=1 in the command queue B will then be consumed. Consequently, the basic subcommand entries of a command will be executed continuously and will not be interrupted by other commands in the consuming end.

To simplify the description, the present invention has been explained with an example of 2-way FIFOs. In fact, this order control scheme is a flexible and useful scheme for any multiple FIFO structure to maintain the order relationship. By using the order control scheme described above, the order relationship between the multiple FIFO ports can be maintained.

To solve the order problem that a posted FIFO may encounter, the present invention provides a dependency counter to maintain the order relationship between non-posted and posted FIFOs. A pending posted write counter in the posted FIFO side is used to record how many pending posted write transactions are still queued in the posted FIFO. Once a new posted write command arrived, the counter will increase. To the contrary, the counter will decrease while a pending posted write command is actually consumed.

The value of the pending posted write counter will be loaded into the dependency counter in the non-posted FIFO side to notify how many posted write transactions must be processed prior to the new incoming non-posted command. Every entry in the non-posted FIFO has a respective dependency counter. When the counter recording the pending posted write number in the posted FIFO decreases, all the dependency counters in the non-posted FIFO will also decrease their values except those with a value of zero. The front entry of the non-posted FIFO can not be consumed in the consuming end until the value of its corresponding dependency counter becomes zero. The dependency counter records pending posted write number immediately and faithfully so that the order relationship can be maintained.

Figure 4A:
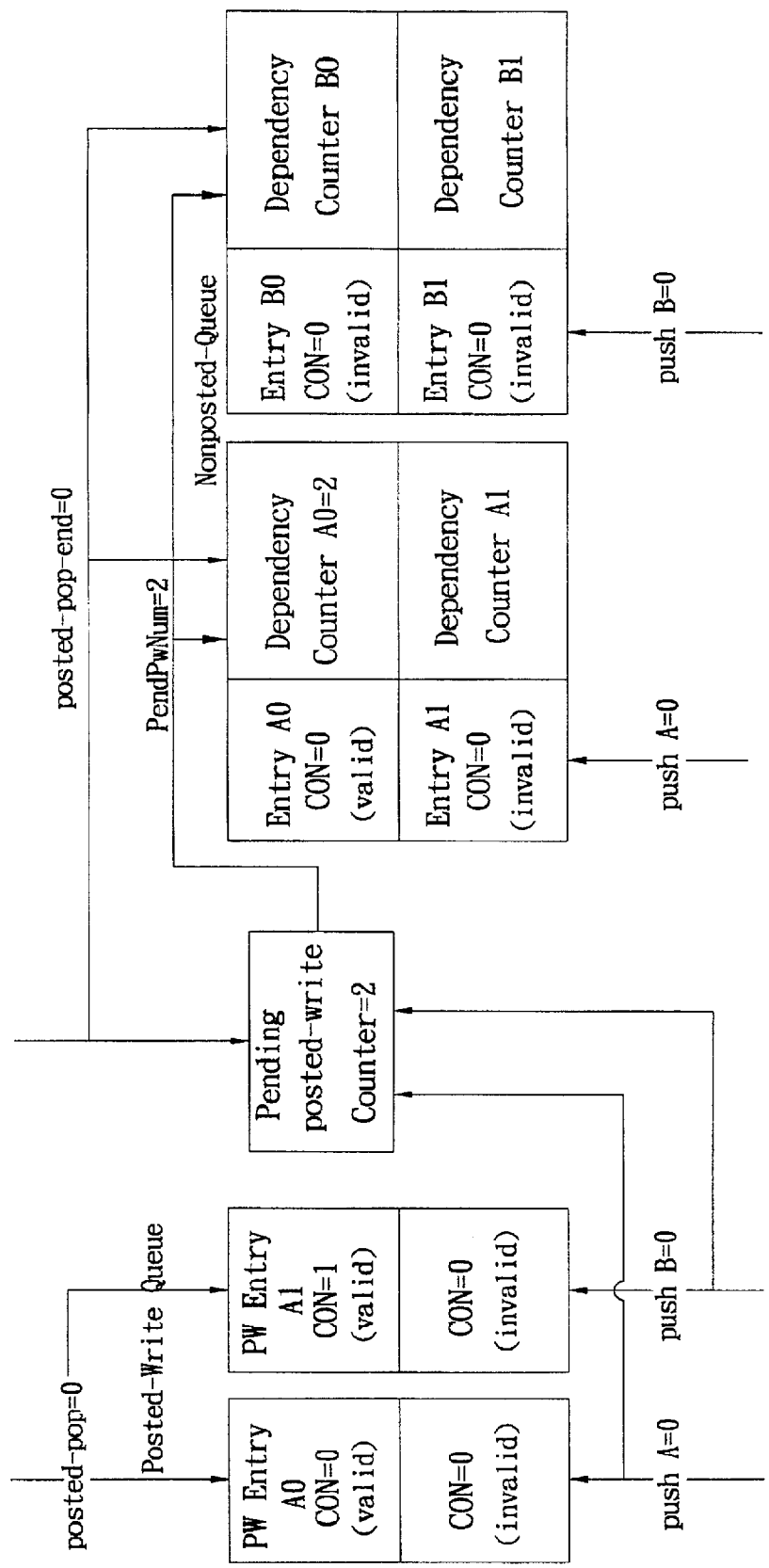
FIGS. 4A–4C illustrate an order control scheme using a pending posted write counter and dependency counters for posted and non-posted FIFOs according to this invention.

In FIG. 4A, the value of the pending posted write counter is 2 to indicate that two posted write commands are still pending in the posted FIFO. The value has been loaded into the dependency counter when the later non-posted command was queued into the non-posted FIFO. In the situation, although the entry of the non-posted FIFO with CON=0 is the front one, it can not be retired until the prior pending posted write commands are consumed.

Figures 1, 4B:
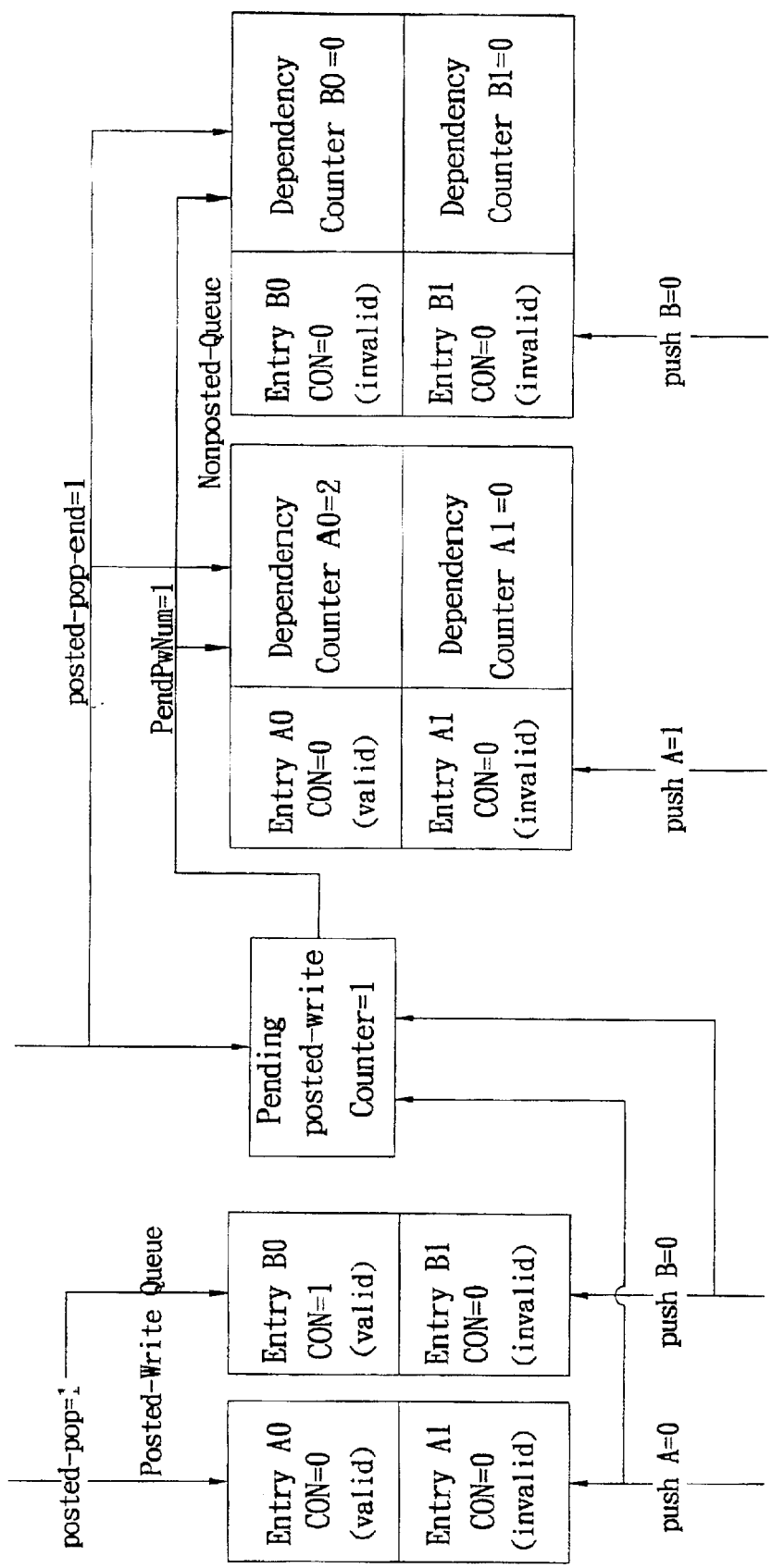
Figures 2, 4B:
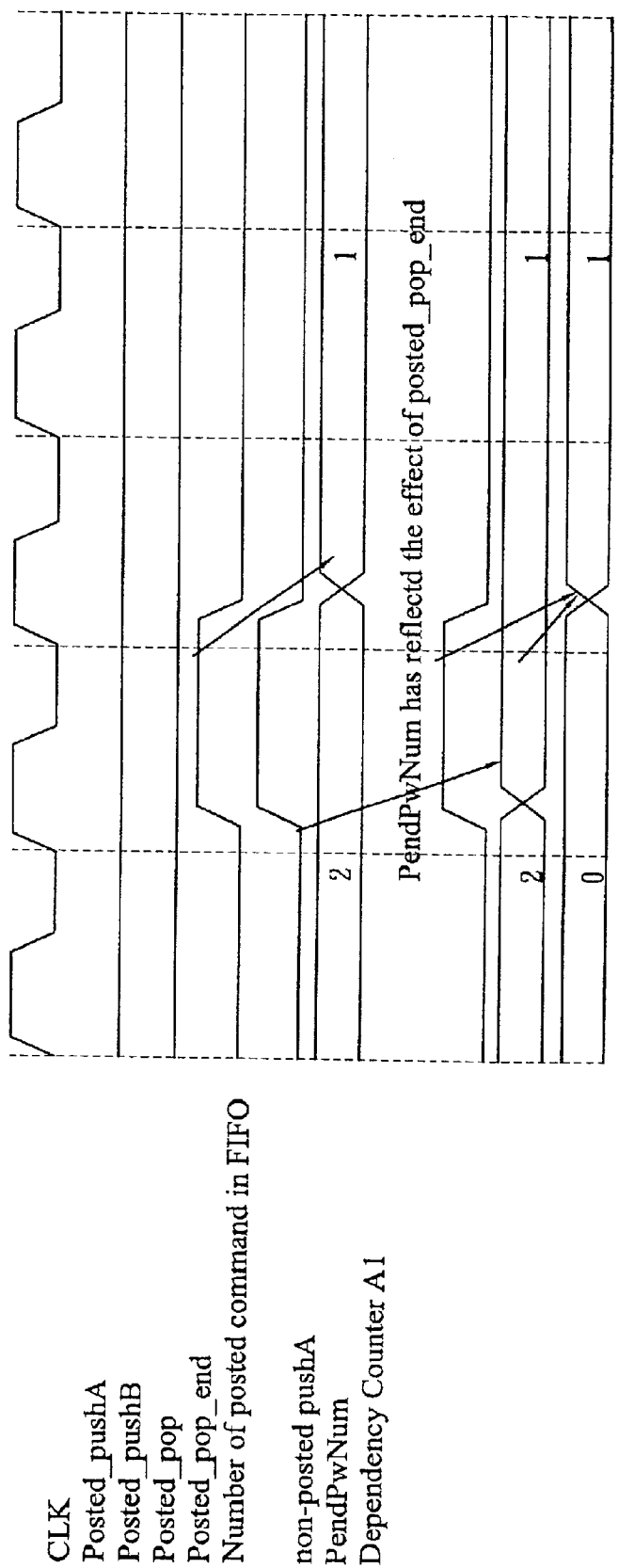
Figures 1, 4C:
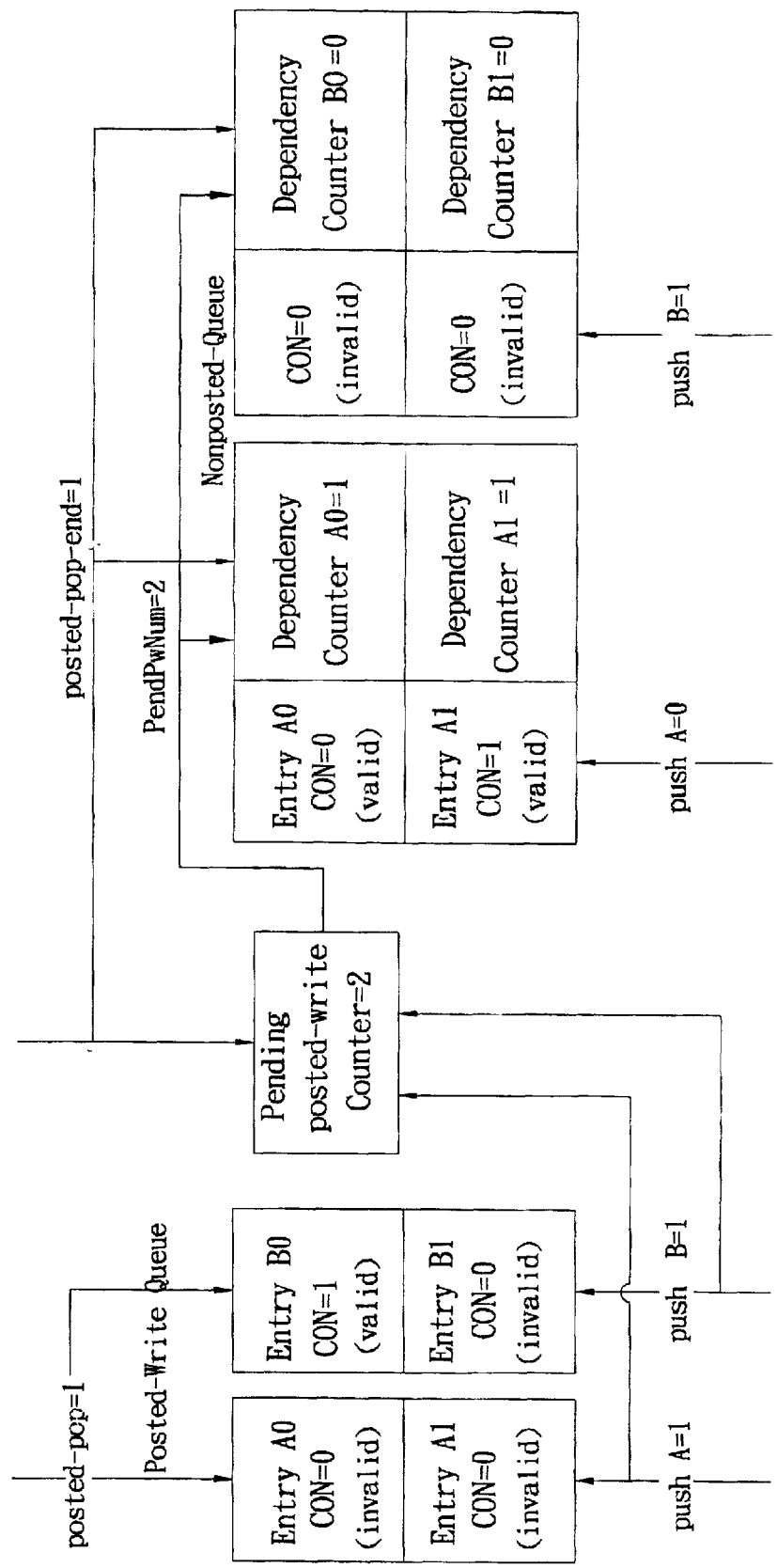
Figures 2, 4C:
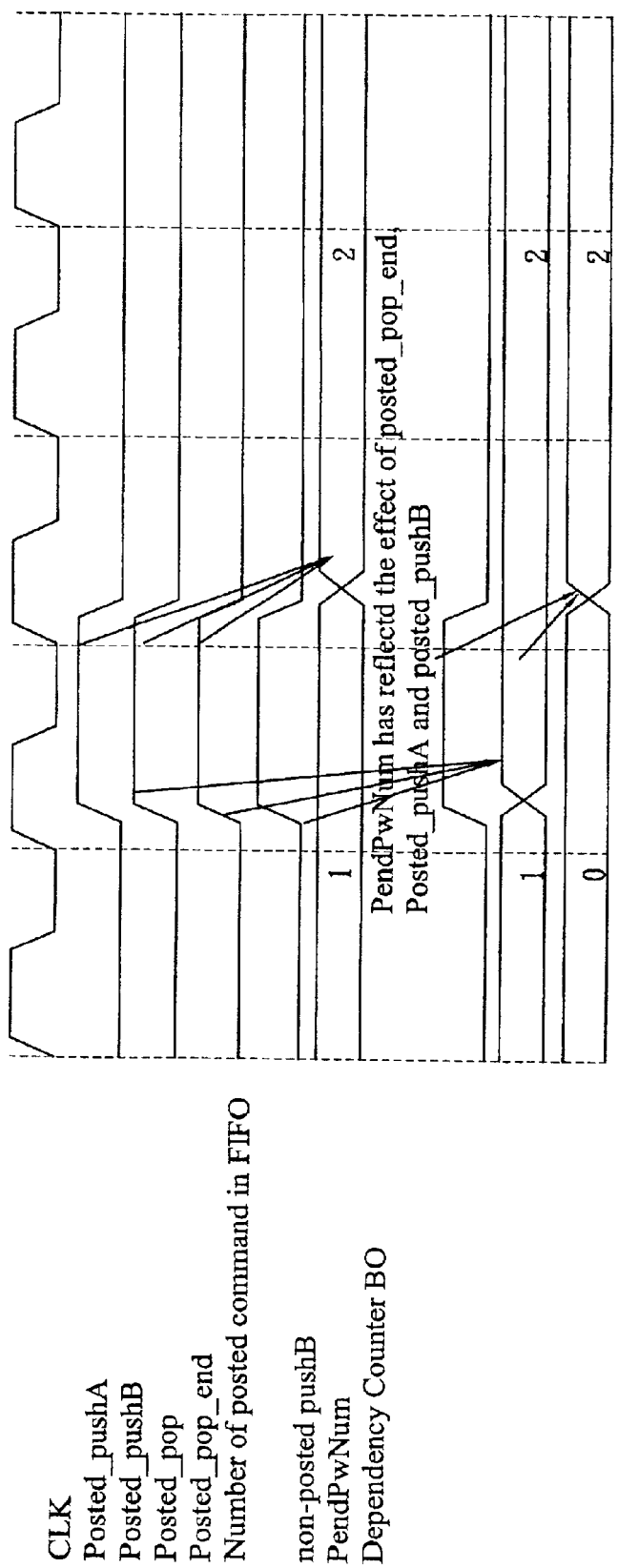

In the case of FIG. 4B-1, a non-posted command occurs when the decrement signal is active. Because the pending-posted write counter records the most recent pending posted write command number, the effect of decrement should be considered too. So in the next clock phase, besides decreasing the dependency counter A0 to 1, a value taking into account the effect of the decrement ;s loaded to the dependency counter A1. FIG. 4B-2 illustrated the timing diagram of the above operation. In FIGS. 4C-1~4C-2, the value of the pending posted write counter must reflect the effect of the incoming posted write commands immediately as it does when decrement occurs. Therefore, the pending posted write number loaded into the dependency counter B0 will be 2 because two posted write commands are going to be stored into the posted FIFO and one posted write command is going to be retired. In practice, the push events may be synchronized from another clock domain. To take the uncertainty of synchronization into account, the posted push events occurred along with the non-posted push event will be regarded as pending posted write commands to be loaded into dependency counter conservatively since the posted commands may occur earlier than the non-posted command before synchronization.

Figure 5:
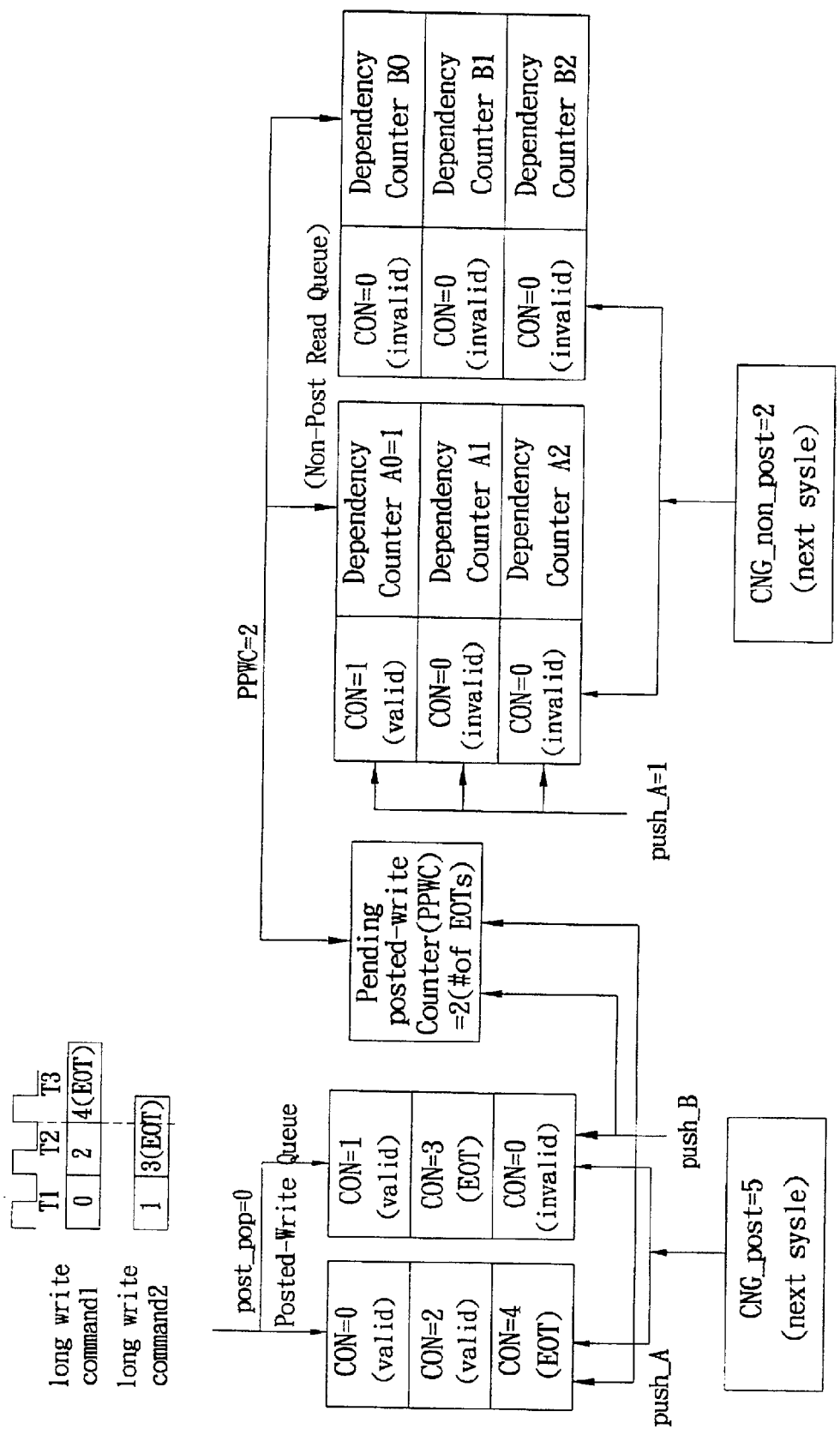
FIG. 5 illustrates the operation of dividing long write transactions into multiple basic write commands with the last basic write command being tagged with an end of transaction indicator and each basic command having a different command order number.

One long posted write transaction may be divided into several parts to be stored into the posted FIFO subsequently in different time as shown in FIG. 5. Before the last part is queued into the posted FIFO, the pending posted write counter should not be increased immediately because the write transaction does not complete from the viewpoint of the device issuing this request. For example, in FIG. 5, two long posted write transactions are queued separately in the two posted FIFOs. The first long write transaction is divided as three basic write commands queued with CON=0, 2 and 4. The second long write transaction is divided as two basic write commends queued with CON=1 and 3. Basic write commands with CON=3 and 4 are tagged with end of transaction (EOT) indicators. As shown in FIG. 5, if a non-posted read command (CON=1) occurs at time T2, it only needs to wait for one posted write command (CON=3 with EOT) but not for the posted write command (CON=4). Therefore, its corresponding dependency counter should be loaded with 1. Making the pending posted write counter increase only when the last part of a write transaction arrives can reduce unnecessary waiting of the non-posted transactions. Similarly, the pending posted write counter and the dependency counter values could not be decreased unless the last part of the write transaction is consumed.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multiple-input multiple-output first-in first-out buffer structure, comprising:
    a command number generator generating a command order number for each command entering said buffer structure;
    a plurality of single-input single-output buffers each having a capacity of buffering multiple commands and storing each incoming command with an associated command order number; and
    a command number comparator comparing the command order number of an outgoing command at each single-input single-output buffer and determining which command to output;
    wherein an incoming command is divided into a plurality of subcommands, each subcommand of a same command is assigned with a same command order number and a last subcommand within a same command is tagged with an end of transaction indicator.

2. The multiple-input multiple-output first-in first-out buffer structure as claimed in claim 1, wherein said command number generator has a cyclic counter for generating a command order number that is incremented by 1 when a command enters said buffer structure, and said command number comparator has a cyclic counter for generating a comparison value that is incremented by 1 when a command leaves said buffer structure.

3. The multiple-input multiple-output first-in first-out buffer structure as claimed in claim 1, wherein the two cyclic counters have an identical period which is greater or equal to the maximum number of commands that can be buffered in said buffer structure.

4. A multiple-input multiple-output first-in first-out buffer structure comprising:
    a command number generator generating a command order number for each command entering said buffer structure;
    a plurality of single-input single-output buffers each having a capacity of buffering multiple commands and storing each incoming command with an associated command order number; and
    a command number comparator comparing the command order number of an outgoing command at each single-input single-output buffer and determining which command to output;
    wherein an incoming command is divided into a plurality of subcommands, each subcommand of a same command is assigned with a different command order number.

5. A command order maintenance scheme for a posted multiple-input and multiple-output first-in first-out buffer structure and a non-posted multiple-input and multiple-output first-in first-out buffer structure, said command order maintenance scheme comprising:
    a pending posted write counter for storing a value which is a total number of pending posted write commands within said posted buffer structure; and
    a plurality of dependency counters each being associated with a command within said non-posted buffer structure, a value of the dependency counter of an associated command being set to the value of said pending posted write counter when said associated command enters said non-posted buffer structure;
    wherein said non-posted buffer structure further comprises a command number generator generating a command order number for each command entering said non-posted buffer structure, a plurality of single-input buffers each having a capacity of buffering multiple commands and storing each incoming command with an associated command order number, and a command number comparator comparing the command order number of an outgoing command at each single-input single-output buffer in said non-posted buffer structure and determining which command to output.

6. The command order maintenance scheme as claimed in claim 5, wherein said posted buffer structure further comprises a command number generator generating a command order number for each command entering said posted buffer structure, a plurality of single-input single-output buffers each having a capacity of buffering multiple commands and storing each incoming command with an associated command order number, and a command number comparator comparing the command order number of an outgoing command at each single-input single-output buffer in said posted buffer structure and determining which command to output.

7. The command order maintenance scheme as claimed in claim 5, wherein said pending posted write counter is increased by 1 when a posted write command enters said posted buffer structure, and decreased by 1 when a posted write command exits said posted buffer structure.

8. The command order maintenance scheme as claimed in claim 5, wherein the value of each dependency counter in said non-posted buffer structure is decreased by 1 if the value is greater than 0 when a posted write command exits said posted buffer structure.

9. The command order maintenance scheme as claimed in claim 8, wherein a command in said non-posted buffer structure is ready to exit if the value of its associated dependency counter becomes 0.

10. The command order maintenance scheme as claimed in claim 5, wherein a long postal write command is divided into a plurality of basic write commands with a last basic write command being tagged with an end of transaction indicator, and said pending posted write counter is increased by 1 only when the last basic write command of a long posted write command enters said posted buffer structure and is decreased by 1 only when the last basic write command of a long posted write command exits said posted buffer structure.

11. A command order maintenance scheme for a posted multiple-input and multiple-output first-in first-out buffer structure and a non-posted multiple-input and multiple-output first-in first-out buffer structure, said command order maintenance scheme comprising:
    a pending posted write counter for storing a value which is a total number of pending posted write commands within said posted buffer structure; and a plurality of dependency counters each, being associated with a command within said non-posted buffer structure, a value of the dependency counter of an associated command being set to the value of said pending posted write counter when said associated command enters said non-posted buffer structure;

wherein the value of each dependency counter in said non-posted buffer structure is decreased by 1 if the value is greater than 0 when a pasted write command exits said posted buffer structure.

12. The command order maintenance scheme as claimed in claim 11, wherein a command in said non-posted buffer structure is ready to exit if the value of its associated dependency counter becomes 0.

13. A command order maintenance scheme for a posted multiple-input and multiple-output first-in first-out buffer structure and a non-posted multiple-input and multiple-output first-in first-out buffer structure, said command order maintenance scheme comprising:

a pending posted write counter for storing a value which is a total number of pending posted write commands within said posted buffer structure; and a plurality of dependency counters each being associated with a command within said non-posted buffer structure, a value of the dependency counter of an associated command being set to the value of said pending posted write counter when said associated command enters said non-posted buffer structure;

wherein a long posted write command is divided into a plurality of basic write commands with a last basic write command being tagged with an end of transaction indicator, and said pending posted write counter is increased by 1 only when the last basic write command of a long posted write command enters said posted buffer structure and is decreased by 1 only when the last basic write command of a long posted write command exits said posted buffer structure.

* * * * *